Feb. 6, 1934.                R. E. FLANDERS                1,945,632
            MACHINE TOOL AND HYDRAULIC FEED MECHANISM THEREFOR
                        Filed Aug. 26, 1930            6 Sheets-Sheet 5
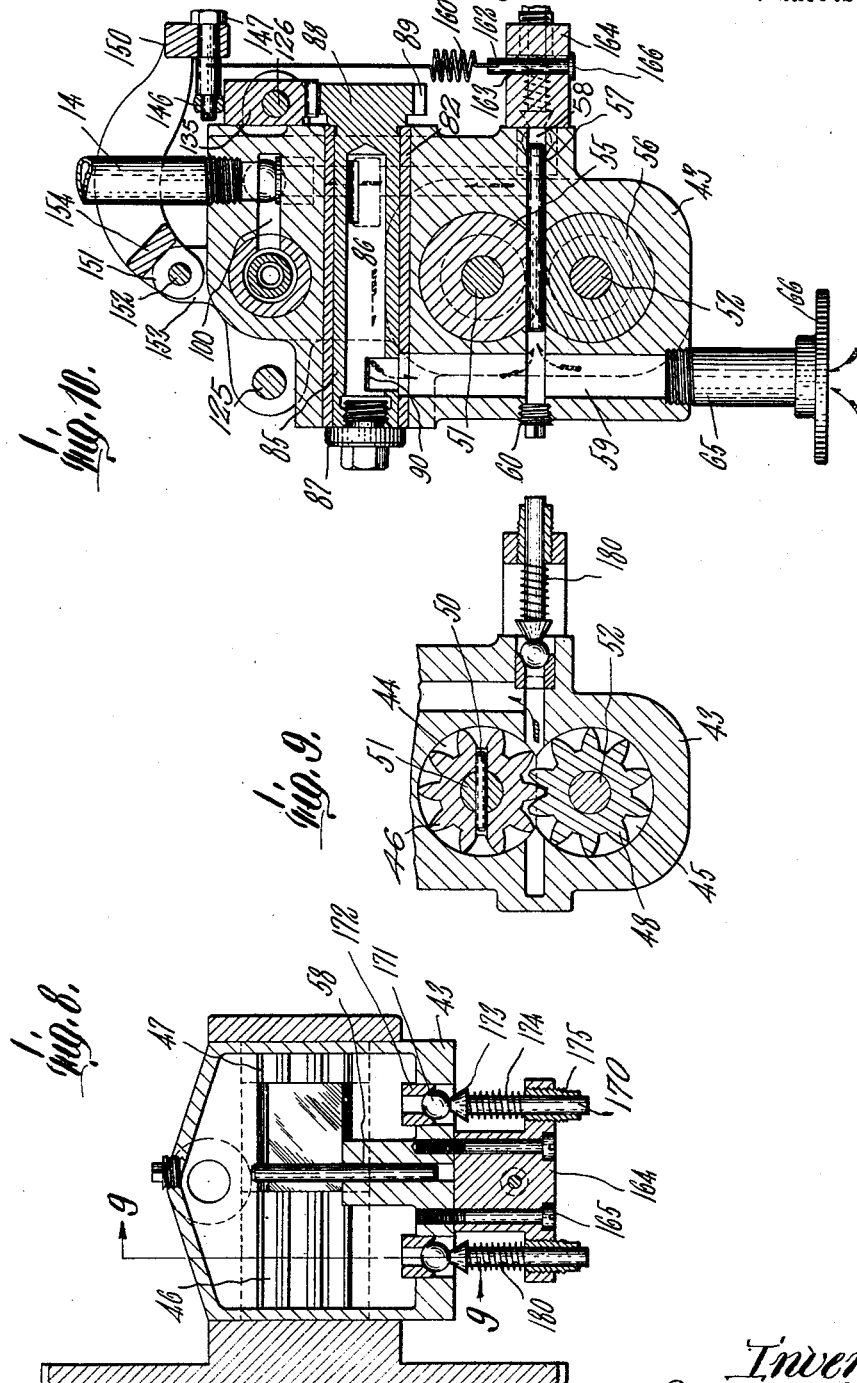
Inventor
Ralph E. Flanders

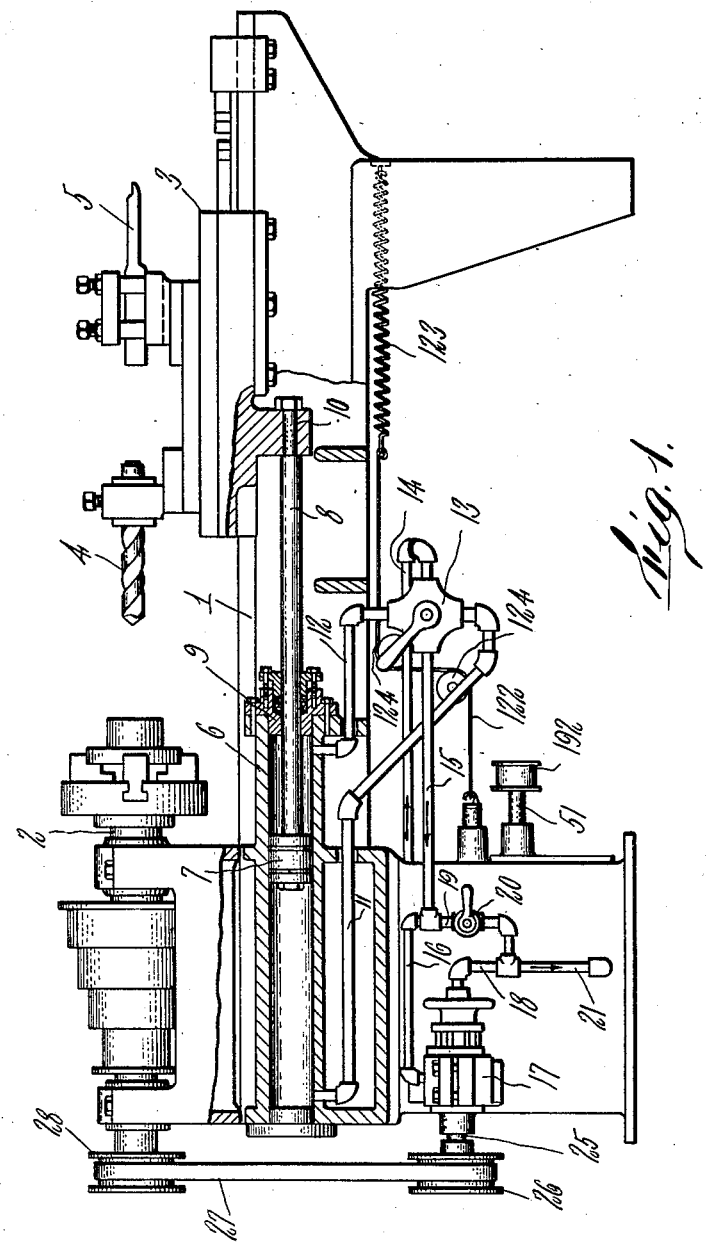

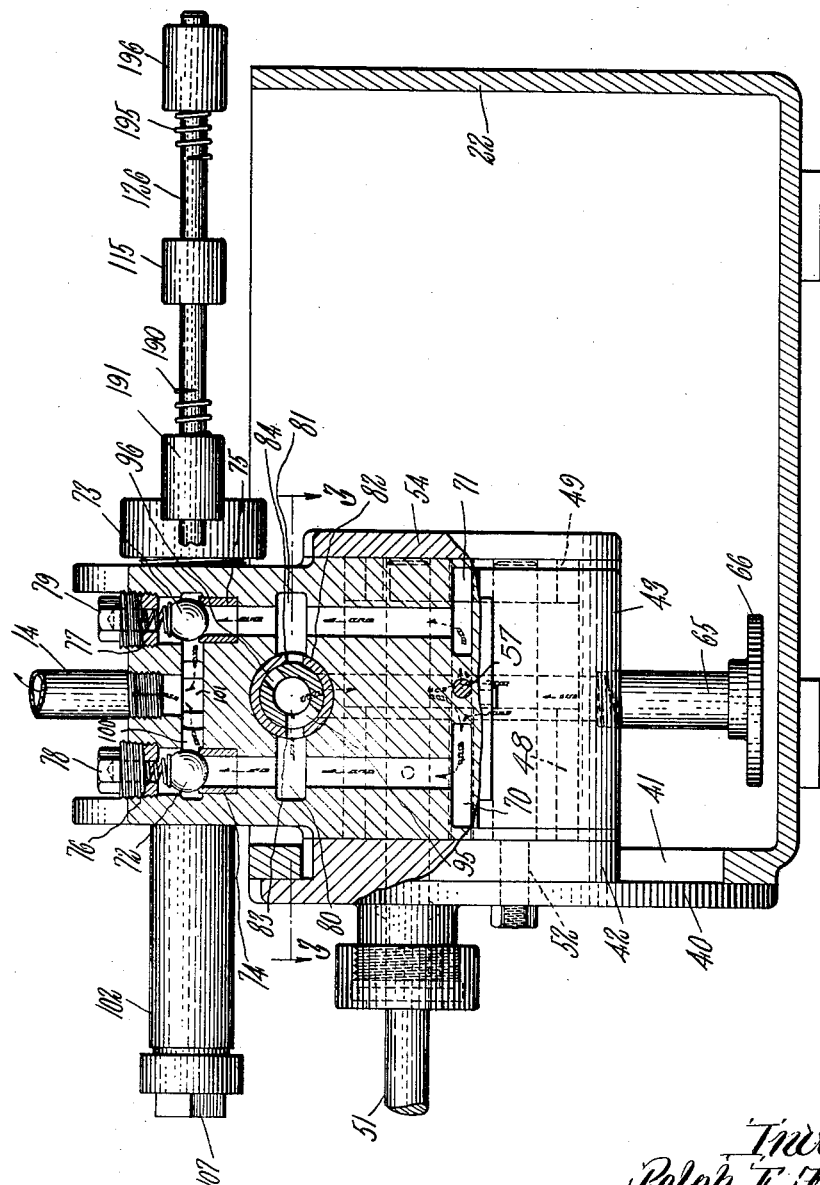

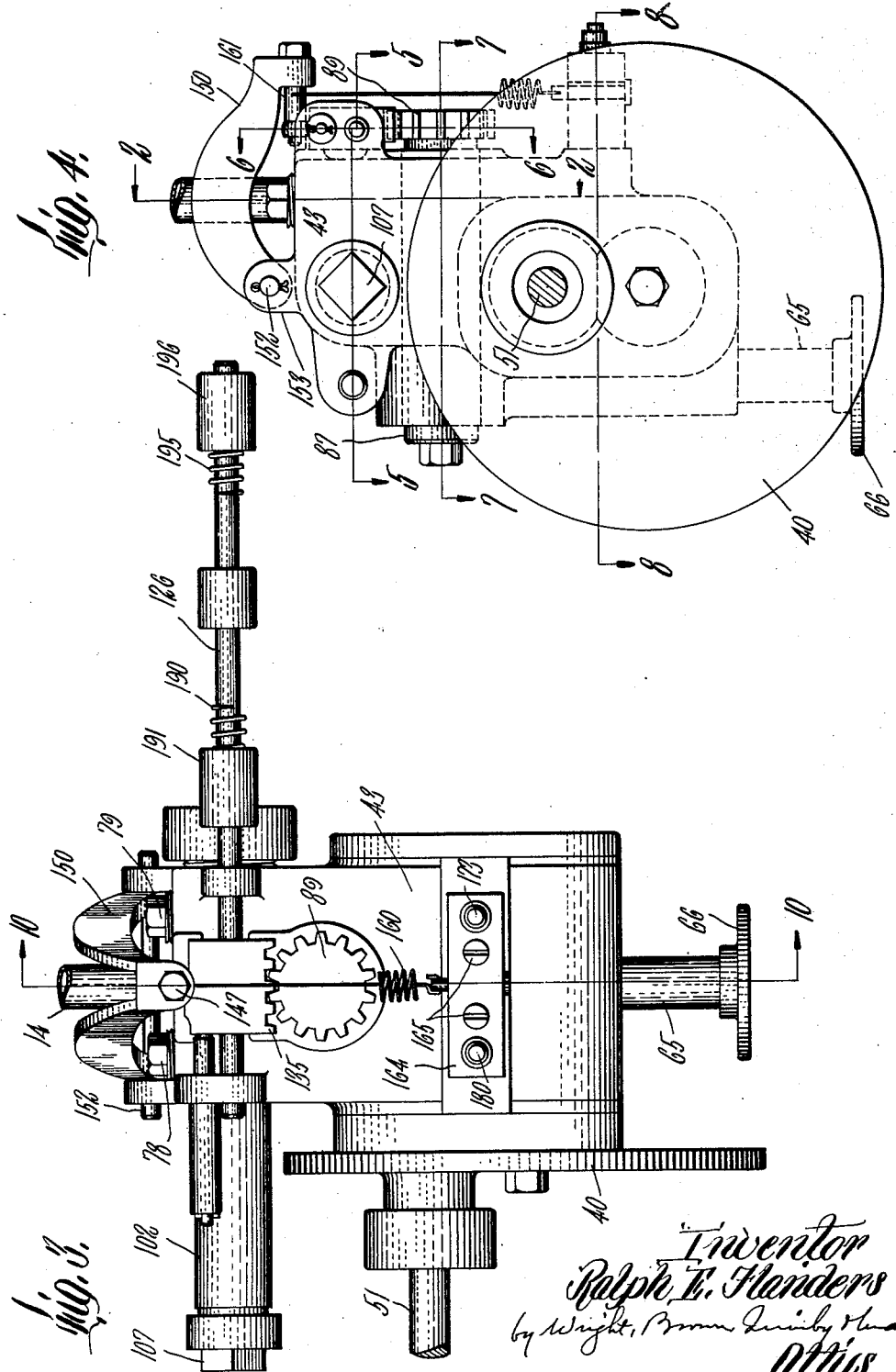

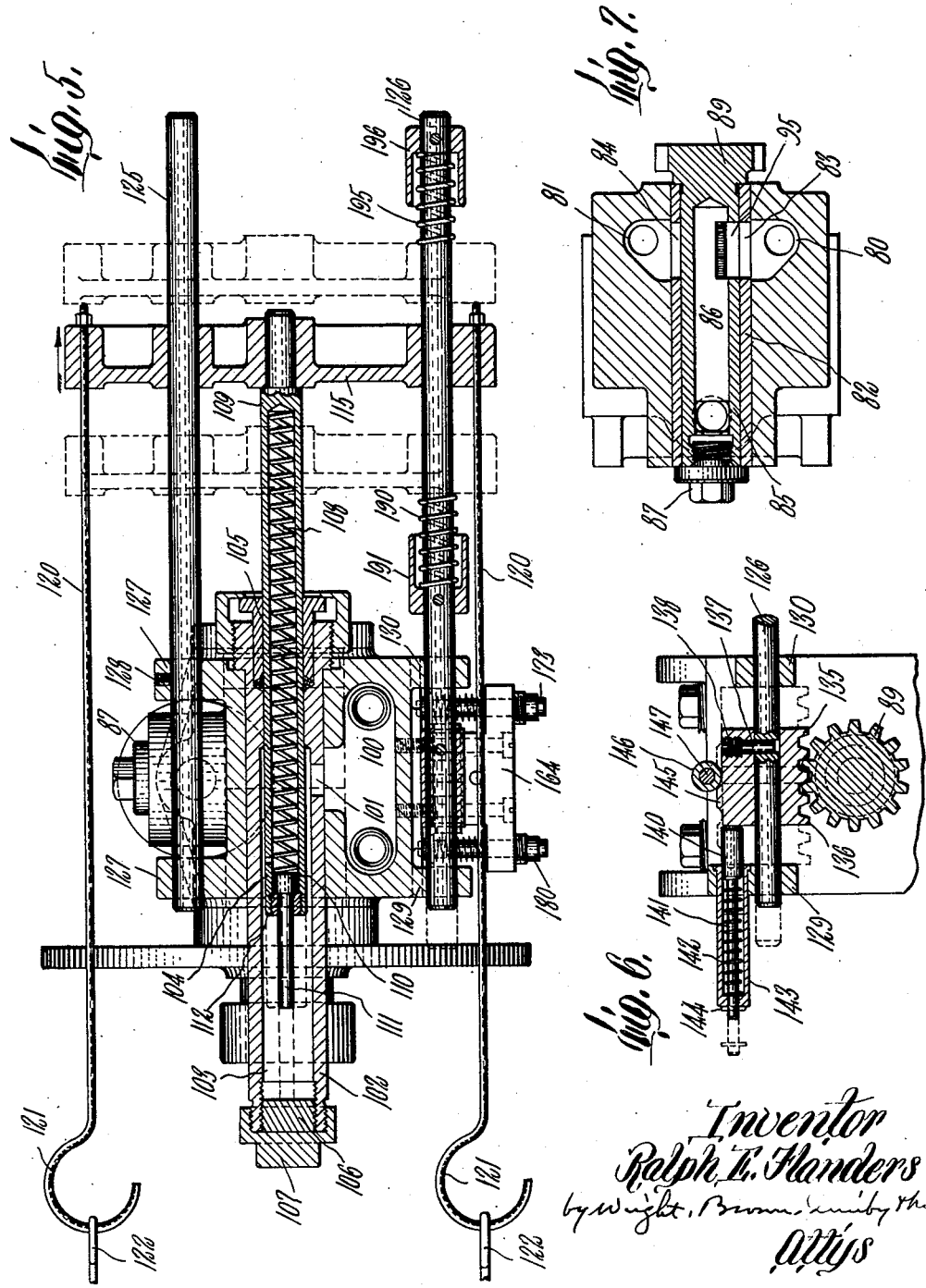

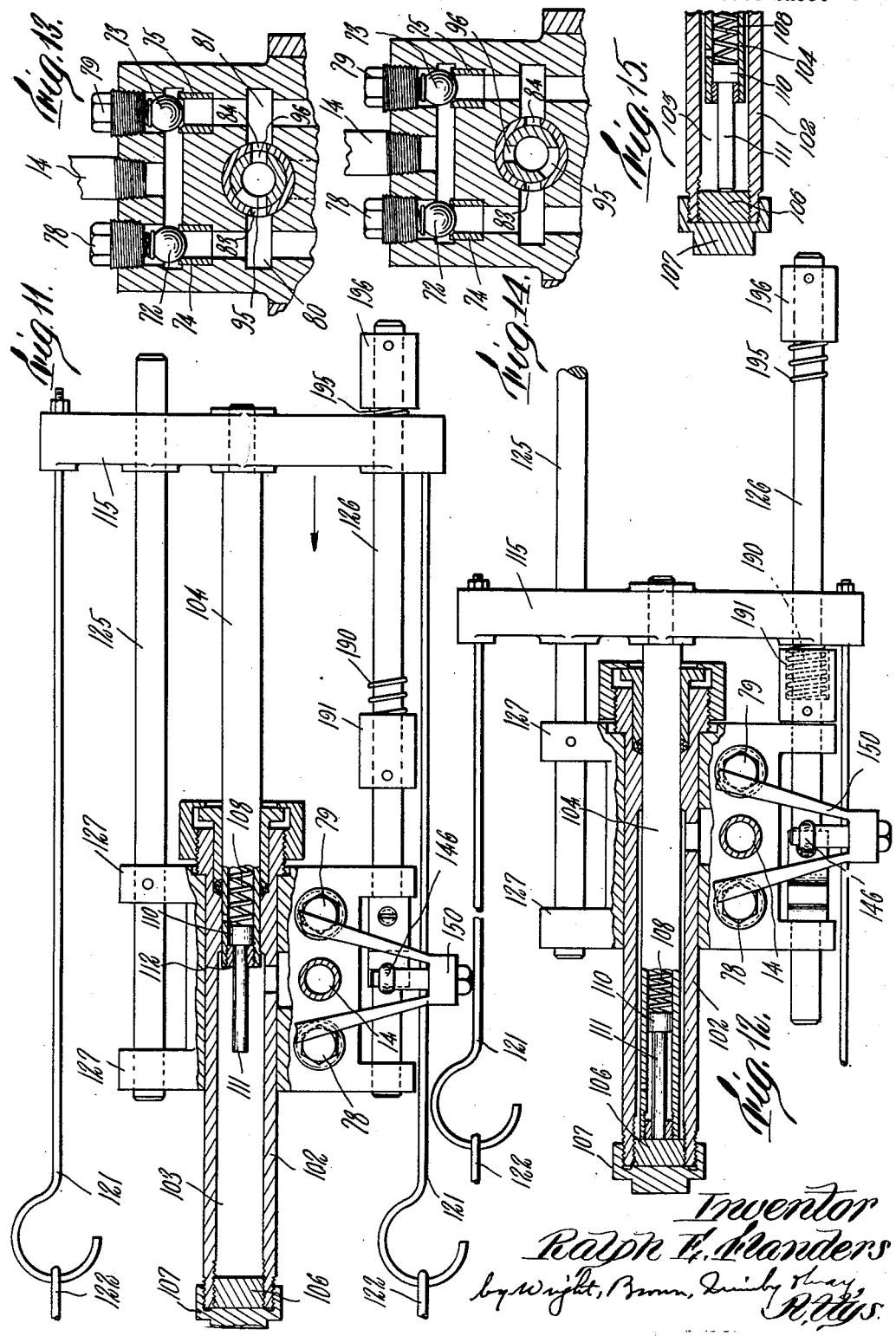

Patented Feb. 6, 1934

1,945,632

UNITED STATES PATENT OFFICE 1,945,632

MACHINE TOOL AND HYDRAULIC FEED MECHANISM THEREFOR

Ralph E. Flanders, Springfield, Vt., assignor to Jones & Lamson Machine Company, Springfield, Vt., a corporation of Vermont Application August 26, 1930. Serial No. 477,929

18 Claims. (Cl. 60—52)

This invention relates to hydraulic mechanisms of the general type illustrated in my application for patent Serial No. 368,306, filed June 4, 1929, and which are capable of desirable application for actuating various mechanisms, such, for example, as machine tool parts. More particularly the present invention relates to the variable pumping and controlling mechanism by which the rate and pressure of liquid supplied is automatically regulated in accordance with the requirements of the actuated mechanism.

In accordance with the present invention a plurality of pumps are employed, one or more of which are rendered inoperative to deliver liquid to the actuated mechanism as the pressure of the liquid supply increases or the rate of use decreases. While this invention in its broader aspects is not limited to any particular type of machine, it will be further described, by way of example, with specific reference to a lathe for which it is eminently suitable.

Referring to the accompanying drawings,

Figure 1 is a side elevation partly broken away and in section of a lathe embodying this invention.

Figure 2 shows the pumping mechanism partly in side elevation and partly in section on line 2—2 of Figure 4, the liquid reservoir being shown partly broken away and the mechanism being in small delivery high pressure position.

Figure 3 is a side elevation of the mechanism, the reservoir being omitted.

Figure 4 is an end elevation of the parts shown in Figure 3.

Figures 5 to 8 inclusive are sections on the correspondingly numbered section lines of Figure 4.

Figure 9 is a detail section on line 9—9 of Figure 8.

Figure 10 is a section on line 10—10 of Figure 3.

Figures 11 and 12 are fragmentary somewhat diagrammatic views similar to a portion of Figure 5, but showing the parts in high pressure no delivery and low pressure fast delivery positions, respectively.

Figures 13 and 14 are views similar to a portion of Figure 2, but showing the valve in position corresponding to Figures 11 and 12, respectively.

Figure 15 is a fragmentary view similar to a portion of Figure 5, but showing in full lines parts shown dotted in Figure 5.

Referring to Figure 1, 1 indicates the supporting frame of a lathe having a rotary work spindle 2 and a tool slide 3 movable along the frame toward and from the work spindle in the usual manner. At 4 and 5 are shown tools carried by the slide 3 and which may be mounted for rotation about a vertical axis in a manner well understood in the art to present either tool in alinement with or parallel to the axis of the spindle 2. Means are provided for moving the slide 3 relative to the spindle to feed the tools into and out of operative relation to the work. As shown this means comprises a cylinder 6 rigidly carried by the frame 1 and having therein a piston 7 provided with a piston rod 8 extending through a suitable stuffing box as at 9 at one end of the cylinder and secured as at 10 to a depending portion of the tool slide 3. Means are provided for conducting a liquid such as oil under pressure to one or the other end of the cylinder while opening the opposite end to discharge thereby to cause the piston to traverse the cylinder in the desired direction to impart the desired tool movement. To this end supply and discharge pipes 11 and 12 lead from opposite ends of the cylinder to a four-way control valve, as at 13, of any suitable type. Through the pipe 14 liquid under pressure may be supplied to the intake of the valve 13 and directed into either pipe 11 or 12 as desired, while at the same time the other of these pipes 11 or 12 is connected through the valve 13 to the discharge pipe 15. In an intermediate position of the valve all the ports are blanked, as is usual with such valves, so that the liquid in the cylinder and pipes 11 and 12 is held stationary. The discharge pipe 15 is shown as communicating with a pipe 16 leading to a liquid metering device as 17 having an exhaust 18. A pipe 19 having a shut off valve 20 therein bypasses the metering device when the valve 20 is opened but when this valve is closed all the liquid being discharged from the cylinder 6 must pass through the metering device. The discharge passes into the pipe 21 from which it is conducted into a reservoir which may be positioned within the machine frame and as shown at 22 in Figure 2.

The metering device 17 may be of any suitable type such as shown, for example, in the Hartness Patent No. 700,644 of May 20, 1902, but preferably is of the improved type more fully shown and described in my application for patent Serial No. 398,693, filed October 10, 1929, now Patent Number 1,841,526, for Metering device. Whatever metering device is used, it is provided with a shaft 25 on which is fixed a pulley 26 which is connected by means of the belt 27 to a pulley 28 on the spindle 2. Metering devices of this character permit a flow of fluid therethrough, dependent in its maximum rate upon the speed of rotation of the shaft 25 and due to the fact that this shaft is driven from the work spindle, it will be seen that the maximum rate of flow through the metering device is dependent on the speed of rotation of this spindle. When the metering device is interposed in the discharge as by closing the valve 20, the discharge of liquid from either end of the cylinder, depending on the position of the valve 13, is rendered relatively slow, this defining the slow feed motion of the tool. When the metering device is by-passed by opening the valve 20, a fast motion of the tool is produced. The liquid is supplied to the cylinder by means of a pumping mechanism shown in detail in Figures 2 to 15 inclusive.

As best shown in Figure 2, this pumping mechanism is carried at one end of the supply tank 22, and has a circular head member 40, which closes an opening 41 in one end of the reservoir 22. This member 40 has a cylindrical hub portion 42 which forms one end of a pump casing having its side walls formed by a block 43. This block 43, as shown best in Figures 9 to 10, is provided with two intersecting cylindrical passages 44 and 45 therethrough within which are journaled upper and lower sets of gear impellers 46, 47 and 48, 49, respectively, fixed by any suitable means such as transverse pins 50 to upper and lower pump shafts 51 and 52, respectively. The hub portion 42 closes off one end of each passage and a cover plate 54 closes off the opposite end of each passage. The intermeshing gears 46 and 48, as shown best in Figure 8, are relatively long axially and constitute the impelling mechanism of a large volume low pressure pump. The gears 47 and 49, however, are of relatively short length and form the impelling members of a small volume high pressure pump. These pairs of impelling elements are separated by a transverse partition comprising a pair of plugs 55 and 56. Each of these plugs is formed cylindrical, except at their confronting faces, which are flattened off to fit each other, and these plugs are fixed in position axially in their respective bores by means of a pin 57, which is seated in mating grooves in the two plugs, and extends into a perforation 58 opening through one side of the pump block 43, as shown in Figures 8 and 10. At the opposite end this bore 58 extends into a combined intake port and by-pass passage 59 in the pump block 43 and out through the side of the pump block, the outer end of the bore being closed off as by means of a screw plug 60. The lower end of the passage 59 is in communication with the inner end of an intake pipe 65, which projects from the pump block toward the base of the reservoir 22, where it is shown as provided with a flanged foot 66. Thus the liquid, which may be oil, is drawn from the lower portion of the reservoir 22 by both the large volume low pressure pump and the small volume high pressure pump. The delivery for these two pumps is separate, however, that for the large volume low pressure pump being into the passage 70 (see Figure 2) and from the low volume high pressure pump into the passage 71. These passages extend upwardly through the pump block and their upper ends are provided with ball check valves 72 and 73, respectively, arranged to seat on sleeve seat members 74 and 75, respectively. These ball check valves are shown as pressed against their seats by means of springs 76 and 77 reacting between these balls and the rear ends of suitable sockets in threaded plugs 78 and 79. Above these check valves both passages 74 and 75 lead to the supply pipe 14 hereinbefore referred to, and which furnishes the liquid supply to be directed by the valve 13 to the desired end of the cylinder 6. Either one or both of the passages 70 and 71 may be put in communication with the intake and by-pass passage 59, thus relieving the pressure therein. For this purpose relief ports 80 and 81 lead from the passages 70 and 71, respectively, to a cylindrical valve casing 82 having a pair of oppositely disposed ports 83 and 84 therein. Within this cylindrical valve casing is a sleeve valve 85. As shown best in Figure 10, this sleeve valve 85 has a central passage 86 which may be closed off at one end by a screw plug 87, the opposite end being closed off by an integral portion which has beyond the casing 82 a circular head 88 formed with a pinion portion 89. This valve 85 is formed adjacent to the plug 87 with a port 90 opening laterally through its wall and which remains in communication with the upper end of the by-pass and intake passage 59 throughout all angular positions of this sleeve valve 85 which it is permitted to take. Toward the closed end of the valve 85 it is provided with a pair of angularly spaced ports 95 and 96. The port 95 is of a greater angular extent than the port 96 and is adapted throughout a considerable range of angular motion of the valve 85 to maintain open communication from the port 80 of the large volume low pressure pump through its central bore 86 to the port 59, thus connecting the delivery of this pump to its intake whereby this pump is by-passed and is rendered inoperative to supply liquid under pressure to move the piston 7. Throughout a smaller angular range of turning of the valve 85, the port 96 maintains open communication between the delivery port 71 of the high pressure low volume pump through its passage 86 to the intake passage 59, thus to by-pass the high pressure small volume pump, and it will be seen that in one angular position, which is shown in Figure 13, both these pumps are open to the by-pass so as to be ineffective to deliver liquid under pressure to operate the machine feed mechanism. This is a high pressure position wherein the high pressure pump has supplied liquid under high pressure faster than it could be used by the motor and has thus built up a reserve supply in the accumulator. This position is assumed, for example, after the valve 13 has been closed, the pumps being operated, and it also may be assumed at times during the low speed feed. Means are provided, however, so that when the pressure in the pipe 14 is relieved, as when the valve 13 is opened to open communication between one end of the cylinder 6 and the discharge and there is little resistance to the motion of the tool slide, the valve 85 is turned into the position shown in Figure 14 to shut off the relief communication of both of the pumps so that both supply fluid under pressure to the pipe 14 thus to start and move the piston 7 at relatively low pressure but at a relatively high speed due to the combined volumes of liquid pumped by both pumps into one end of the cylinder 6. Provision is also made whereby when the pressure in the pipe 14 exceeds a predetermined value, as when the metering device 17 is cut into the discharge and thus slows down the possible rate of movement of the piston 7, to turn the valve 85 into the position shown in Figure 2, intermediate to the positions of Figures 13 and 14 so as to by-pass the low pressure large volume pump while maintaining the high pressure low volume pump in operation and whereby when the volume of liquid under pressure delivered by the low volume or feed pump, which normally delivers faster than the liquid can be used by the motor at a slow speed, reaches a predetermined value and/or when the pressure of the supply reaches a predetermined value higher than that necessary to by-pass the large volume pump, both pumps are opened to the by-pass and any liquid supplied to the motor cylinder 6 comes from an accumulator as long as these conditions of volume and/or pressure persist. Ordinarily a control by volume changes rather than by pressure difference is desirable in order to maintain pressure constant during the cutting stroke of the tool, though either volume change or pressure difference might be used. In the mechanism shown, volume change control predominates, although due to the use of spring loading means there is also a pressure difference control. By using long loading springs the pressure variation may be kept low. In principle pressure variation during feed might be eliminated by the use of weights for loading the accumulator ram, but this would interpose undesirable inertia factors to operation of the mechanism. Mechanism for these purposes will now be described.

Above the check valves 72 and 73 the liquid passes into a passage 100 (see Figures 2, 5 and 10) which is in communication with the pipe 14. This passage 100 leads through a port 101 into a hydraulic accumulator cylinder 102. This cylinder has a central bore 103 in which rides a plunger 104 of somewhat less diameter than the bore 103, this plunger passing through a suitable stuffing box indicated generally at 105 in one end of the cylinder 102. The other end of the cylinder 102 is closed off as by a plug 106 threaded interiorly thereof and a supplemental cap 107 threaded exteriorly thereof. This plunger 104 is hollowed throughout the greater portion of its length and houses a spring 108 which bears at one end against the closed end 109 of the plunger, and at its opposite end against the head 110 of an abutment pin 111 which projects through a central bore of a plug 112 which is threaded into the otherwise open end of the plunger. The abutment pin 111 is sufficiently loose in the hole in the plug 112, which acts merely as a guide for its motion, and the head 110 of this pin is sufficiently loose in the hollow of the plunger 104, to permit free passage of liquid therepast. Adjacent to the end 109 of the plunger it is fixed to a crosshead 115. This crosshead is shown as provided at opposite sides of the plunger 104 with a pair of hooked rods 120 to the hooks 121 of which may be engaged the ends of cables or other suitable members 122 which lead to loading springs 123. As shown in Figure 1 the cables 122 may pass over suitable guide pulleys 124 and from thence to the springs 123. These springs are preferably of considerable length in order that they may be under little different tension throughout the full range of movement of the crosshead 115, and they are preferred to weights for loading purposes for the reason that they do not interpose inertia forces to movement of the crosshead. This crosshead is mounted for sliding movement on a pair of bars 125 and 126. The bar 125 is shown as fixed, one end portion extending through spaced perforated lugs 127 on the pump block 43 in one of which lugs it may be fixed as by means of the set screw 128. The other bar 126 is mounted to slide through perforated guide lugs 129 and 130 on the opposite side of the pump block 43 and between these lugs 129 and 130 it has fixed thereon a rack member 135 having on its lower face rack teeth 136 which mesh with the teeth of the valve pinion 89. This rack member may be fixed to the bar 126 as by means of the pin 137 having one end extending into a perforation in the bar 126 and its other end portion as at 138 threaded into a mating socket in the rack member 135. By longitudinal movement of the bar 126, therefore, it will be evident that the valve 85 can be rocked in either direction between the position shown in Figure 14 when both pumps are effective to the position shown in Figure 13 when both pumps are opened to the by-pass. The bar 126 is normally urged to an intermediate position by means of a plunger 140 engaging one end of the rack piece (shown in Figure 6) and having a stem 141 surrounded by a coil spring 142 housed in a tubular guide member 143 carried by the guide lug 129 and through which the stem 141 is slidably guided. Means such as a cotter pin 144 are provided to retain the plunger 140 in position.

The upper face of the rack member 135 is shown as provided with a projecting lug 145 which acts as a latch element with which cooperates a roller 146 journaled on a bolt 147, which, as shown in Figures 4 and 10, is carried at the outer end of a bifurcated arm 150 straddling the pipe 14 and having its spaced rear portions, as at 151, journaled on a pin 152 extending through a pair of spaced lugs 153 extending upwardly from the top of the pump block 43. The rear portions of the lever 150 may be joined, if desired, by means of an integral web 154 (see Figure 10). This lever is normally urged downwardly as by means of a spring 160 having its upper end engaged with a sleeve 161 on the bolt 147 and its lower end engaged with the upper end of a pin 162 extending through a perforation 163 in a bracket 164 made fast to one side face of the pump block as by means of screws 165 (see Figures 3 and 8). The head 166 of the pin 162 engages the under face of this bracket and anchors the lower end of the spring 160 in position. This latch mechanism acts to prevent the rack member 135 from being moved over to the right, as shown in Figures 5 and 6, away from intermediate position except by the exercise of a sufficient force exerted on the bar 126 to lift the roller 146 to permit the lug 145 to pass therebeneath. When this is done and the lug 145 is to the right of the roller 146 in the dotted line position with the rack piece 135 in contact with the lug 130, the valve is rocked to the position shown in Figure 13 where both valve ports 96 and 95 are in communication with the passage 86 by passing both pumps so that the fluid supply for the motor cylinder is derived solely from the accumulator. As liquid is taken from the accumulator, the accumulator plunger is drawn in by the loading springs until the pressure of the liquid in the accumulator has been lowered to such a degree that the loading spring pressure is sufficiently in excess thereof to raise the latch mechanism and snap the rack member lug 145 to the left, this pressure of the liquid thus being somewhat less than its pressure which is necessary to snap the rack member to the right to by-pass both pumps.

In operation when the valve 13 is turned to open one end of the cylinder 6 to the exhaust the metering device being by-passed, the piston 7 moves thus relieving the pressure in the pipe 14 and consequently relieving the pressure in the cylinder 103. The loading springs then pull the crosshead 115 to the left, since the pressure within the cylinder 103 is no longer sufficiently great to prevent such motion, and the plunger 104 is moved to its extreme left hand position with the spring 108 compressed, the plunger being in the position shown in Figure 12. In this position of the parts the crosshead 115 has contacted with and compressed the coil spring 190 which surrounds the bar 126 and is fixed in a suitable housing 191 fixed thereto. This spring 190 is compressed sufficiently to overcome the pressure of the abutment 140 on the rack piece 135 thus carrying the rack piece to the left, as viewed in Figure 6, until it contacts and is stopped by the lug 129. This rocks the valve 85 to the position shown in Figure 14 where both the ports 95 and 96 are blanked, thus cutting off both of the pumps from their by-pass relief connections so that both are effective in supplying liquid under pressure to the cylinder 6. This constitutes the high speed travel condition of the mechanism as when the tool is being moved up toward the work, it being understood, of course, that both pumps are being rotated as by a suitable belt (not shown) engaging the drive pulley 192 fixed to the pump shaft 51.

If now when the tool approaches the work, the valve 20 be turned so as to interpose the metering device 17 in the discharge from the cylinder 6, a resistance to the movement of the piston 7 is interposed, which also lowers the rate of use of the liquid by the cylinder 6. The liquid is supplied by the two pumps much faster than it is used and this excess passes into the accumulator cylinder 103 and forces the plunger 104 to the right, being aided by the springs 108 and 142, against the tension of the loading springs 123 until the pin 111 is fully projected but engages the plug 106 as shown in Figure 15, whereupon the springs 108 and 142 are no longer effective to aid the pressure of the liquid in balancing the loading springs and the liquid is itself under sufficient pressure to do this. The rack and pinion are then in the position shown in Figure 6 and the valve is in the position shown in Figure 2 in which the fast motion pump is by-passed, the slow motion feed pump only being effective. This action of the mechanism in controlling the by-pass of the fast motion pump may perhaps be best understood by assuming certain numerical values. If the accumulator ram 104 has a cross sectional area of one square inch, the loading springs exert a pressure of 500 pounds, the spring 108 requires 400 pounds to compress it to the position shown in Figure 12, and if the pressure of the spring 141 be 10 pounds the liquid pressure required in the accumulator cylinder chamber to move the ram 104 from the position of Figure 12 will be 500−(400+10)=90 pounds. In other words, as long as the pressure required for operation of the parts is 90 pounds or less, both pumps will be operative and whenever this pressure exceeds 90 pounds the fast motion pump will be connected to the by-pass. The capacity of the feed pump is designed to be greater than the rate of the discharge of the meter so that continued operation of this pump gradually forces the accumulator ram further to the right, as shown in Figure 5, until the position shown in Figure 11 is reached at which point the spring 195 has been compressed sufficiently to snap out the latch roll 146, throwing the rod 126 to its extreme right hand position with the latch roll 146 on the left hand side of the projection 145 (see right hand dotted position in Figure 6) and with the valve in the position shown in Figure 13, both pumps being connected to the by-pass and inoperative to supply liquid to the accumulator or to the cylinder 6. In this position of the parts with the feed still in operation and the liquid discharging through the meter, pressure is furnished by the accumulator loading springs 123 and the accumulator ram gradually moves to the left as the liquid is metered. When it reaches the position shown in Figure 15 with the pin 111 in contact with the cap 106, the spring 190 has been compressed enough to snap out the latch roll so that the lug 145 is again in full line position in Figure 6 and the valve is in the position of Figure 2 whereby the feed pump is operative. The accumulator then begins to fill again, gradually forcing the plunger out until the feed pump is again opened to the by-pass as before described. In the course of a long cut this process of filling and discharging the accumulator may take place several times. The latch mechanism prevents fluttering or hunting movement of the valve between its two positions for such filling and discharge since due to its material pressure differences are necessary to cause the valve to be shifted in opposite directions between the position where both pumps are inoperative and when the feed pump is operative. On the completion of the cut, throwing the valve 13 will reverse the direction of tool traverse and opening the valve 20 will again reduce the pressure in the accumulator and cylinder 6 almost completely, permitting the accumulator ram to return to the position shown in Figure 12 with both pumps operative to effect a quick return of the tool.

Safety relief valves to prevent excessive pressure should the accumulator mechanism become blocked or otherwise fail to function may be provided. One of these is shown at 170 (see Figure 8) to limit the pressure from operation of the low volume high pressure pump. As shown this valve comprises a ball 171, which is normally seated on its seat 172 by means of a pin 173 having its head pressed against the ball by a spring 174, this pin being slidable through a sleeve 175 having threaded engagement in an opening in the bracket 164. The maximum pressure which may be delivered by both pumps working together is controlled by a similarly constructed relief valve at 180.

From the foregoing description of an embodiment of this invention, it should be evident to those skilled in the art that various changes and modifications might be made without departing from the spirit or scope of the invention as defined by the appended claims.

I claim:

1. In combination, a fluid pressure operated mechanism, a pair of fluid pumps for supplying fluid under pressure to said mechanism, means responsive to the pressure of fluid delivered to said mechanism for causing one or both of said pumps to deliver fluid to said mechanism when said pressure is low, said responsive means having a substantially constant loading when subjected to a higher pressure thereby maintaining said higher pressure substantially constant and being responsive to the volume of the supply of fluid under such higher pressure to cause one pump to deliver fluid to said mechanism when said volume is below a predetermined amount and to render said one pump ineffective to so deliver fluid when said volume reaches a predetermined amount.

2. In combination, a fluid pressure operated mechanism, a pair of fluid pumps having delivery ports leading to a passage to said mechanism, a relief port from each of said delivery ports, means responsive to fluid pressure in said passage for closing both relief ports when said pressure is low, whereby both pumps deliver fluid to said passage and for opening one of said relief ports when said pressure is higher whereby one only of said pumps delivers fluid to said passage, and responsive to the amount of fluid under such high pressure for opening both of said relief ports when said supply reaches a predetermined volume, said responsive means having a substantially constant loading only when subjected to said higher pressure to maintain said higher pressure substantially constant and means for preventing back flow from said passage to said relief ports.

3. In combination, a fluid pressure operated mechanism, a pair of fluid pumps having delivery ports leading to a passage to said mechanism, a relief port from each of said delivery ports, and means responsive to fluid pressure in said passage for closing both relief ports when said pressure is low whereby both pumps deliver fluid to said passage and for opening one of said relief ports when said pressure is higher whereby one only of said pumps delivers fluid to said passage, said responsive means having load means of substantially constant value effective when said one pump only is delivering fluid thereto.

4. In combination, a fluid pressure operated mechanism, a pair of fluid pumps having delivery ports leading to a passage to said mechanism, a relief port from each of said delivery ports, and means responsive to fluid pressure in said passage for closing both relief ports when said pressure is low whereby both pumps deliver fluid to said passage and for opening one of said relief ports when said pressure is higher whereby one only of said pumps delivers fluid to said passage and for opening both of said relief ports when the supply of fluid under the higher pressure reaches a predetermined amount, said responsive means having loading means of substantially constant value effective when said higher pressure is maintained to cause said higher pressure to be substantially constant.

5. In combination, a fluid pressure operated mechanism, a pair of fluid pumps having delivery ports leading to a passage to said mechanism, a relief port from each of said delivery ports, a movable element subject to fluid pressure in said passage, means for loading said element in opposition to said pressure, and means responsive to the position of said element for closing both of said relief ports when said pressure is low and for closing one of said relief ports when said pressure is higher, said loading means being substantially constant in amount throughout the higher pressure positions of said element.

6. In combination, a liquid pressure operated mechanism, a pair of liquid pumps having delivery ports leading to a passage to said mechanism, a relief port from each of said delivery ports, a valve for controlling both of said relief ports and closing both relief ports in one position, one relief port only in a second position, and opening both relief ports in a third position, an accumulator subject to liquid under pressure in said passage and having a loaded plunger responsive in its position to the amount of liquid in said accumulator, and operative connections between said plunger and valve for causing said amount to determine which of its positions said valve takes, the load on said plunger being variable in one portion of its path and substantially constant throughout another portion thereof.

7. In combination, a liquid pressure operated mechanism, a pair of liquid pumps having delivery ports leading to a passage to said mechanism, a relief port from each of said delivery ports, a valve for controlling both of said relief ports and closing both relief ports in one position, one relief port only in a second position, and opening both relief ports in a third position, an accumulator subject to liquid pressure in said passage and having a loaded plunger responsive in its position to the amount of liquid in said accumulator and to its pressure, and operative connections between said plunger and valve for causing said amount and pressure to determine which of its positions said valve takes, said connections including a yielding element and means for holding said valve for movement from one to another of said positions until said yielding element has been stressed a predetermined amount.

8. In combination, a liquid pressure operated mechanism, a pair of liquid pumps having delivery ports leading to a passage to said mechanism, a relief port from each of said delivery ports, a rotary valve positioned between and controlling said relief ports, closing both of said relief ports in one angular position, one relief port only in a second angular position, and opening both relief ports in a third position, an accumulator subject to liquid under pressure in said passage and having a loaded plunger responsive in its position to the amount of liquid in said accumulator and to said pressure, and operative connections between said plunger and valve for causing said amount and pressure to determine the angular position of said valve.

9. In combination, a liquid pressure operated mechanism, a pair of liquid pumps having delivery ports leading to a passage to said mechanism, a relief port from each of said delivery ports, a rotary valve positioned between and controlling said relief ports, closing both of said relief ports in one angular position, one relief port only in a second angular position, and opening both relief ports in a third position, an accumulator subject to liquid under pressure in said passage and having a loaded plunger responsive in its position to the amount of liquid in said accumulator and to its pressure, and operative connections between said plunger and valve for causing said amount and pressure to determine the angular position of said valve, said connections including a yielding element, a reciprocable element connected to said yielding element and having a projecting lug, and a spring pressed member riding on said reciprocable element and yieldable to permit the passage of said lug only when said yielding element has been stressed to a predetermined extent.

10. In combination, a liquid pressure operated mechanism, a pair of liquid pumps having delivery ports leading to a passage to said mechanism, a liquid accumulator receiving liquid from said passage, means operative as said accumulator receives increasing amounts of liquid from a position where both pumps deliver liquid to said pump for rendering first one of said pumps inoperative to deliver liquid to said passage, and then to render the other pump inoperative to deliver liquid to said passage, and means for loading said accumulator variable in its smaller volume condition to cause said one pump to be rendered inoperative on a substantial increase of pressure in said passage and substantially constantly in its larger volume condition to cause both pumps to be inoperative when a predetermined volume of liquid under such increased but substantially constant pressure has been stored in said accumulator.

11. In combination, a fluid pressure operated mechanism, fluid metering means for limiting the rate of motion of said mechanism, a fluid pump or delivering fluid under pressure to said mechanism at a rate beyond the capacity of said mechanism moving at its limited rate to receive it, means including an accumulator to receive the excess fluid from said pump, and mechanism controlled by said accumulator for rendering said pump inoperative to deliver fluid to said mechanism and to supply fluid under pressure from said accumulator thereto when said excess has reached a predetermined amount and to render said pump again operative when said excess has been reduced to a predetermined amount.

12. In combination, a fluid pressure operated mechanism, fluid metering means for limiting the rate of motion of said mechanism, a fluid pump for delivering fluid under pressure to said mechanism at a rate beyond the capacity of said mechanism moving at its limited rate to receive it, means including an accumulator receiving the excess fluid under pressure from said pump, and mechanism controlled by said accumulator acting to by-pass the delivery from said pump and to deliver fluid under pressure from said accumulator to said mechanism when said excess reaches a predetermined amount, and to cut out said by-pass and to cause said pump to deliver to said mechanism when said excess has been reduced to a smaller predetermined amount.

13. In combination, a fluid pressure operated mechanism, a pair of fluid pressure pumps for delivering fluid under pressure to said mechanism, fluid metering means actuable to limit the speed of said mechanism to a low value at which low speed one of said pumps delivers fluid under pressure faster than it can be utilized by said mechanism, means including an accumulator receiving the excess of fluid under pressure delivered by said one pump when said mechanism is operated at said low speed, and mechanism controlled by said accumulator to render the other of said pumps inoperative to deliver fluid to said mechanism when the pressure of said delivered fluid rises to a predetermined point, and to render said one pump also inoperative to deliver fluid under pressure to said mechanism when said excess reaches a predetermined volume and to then feed fluid under such increased pressure from said accumulator until such excess has been reduced to a predetermined amount.

14. In combination, a fluid pressure operated mechanism, a pair of fluid pumps for delivering fluid under pressure to said mechanism, fluid metering means actuable to limit the speed of said mechanism to a low value at which low speed one of said pumps delivers fluid under pressure faster than it can be utilized by said mechanism, means including an accumulator receiving the excess of fluid delivered by said one pump when said mechanism is operating at said low speed, and mechanism controlled by said accumulator to by-pass the delivery of the other of said pumps when the delivery pressure rises to a predetermined point to by-pass the delivery of said one pump also when said excess reaches a predetermined volume and then to feed fluid under said higher pressure from said accumulator to said mechanism, to cut out the by-pass for the delivery of said one pump to cause said one pump to feed to said mechanism when said excess has been reduced to a predetermined small volume, and to cut out the other by-pass and permit both pumps to feed to said mechanism when the delivery pressure falls to a relatively low value.

15. In combination, a liquid pressure operated mechanism, a pair of liquid pumps having delivery ports leading to a passage to said mechanism, a liquid accumulator receiving liquid from said passage, means controlled by said accumulator operative as said accumulator receives increasing amounts of liquid from a condition where both pumps deliver liquid to said passage for rendering first one of said pumps inoperative to deliver liquid to said passage, and then to render the other pump inoperative to deliver liquid to said passage, and means for loading said accumulator to cause said one pump to be rendered inoperative on a substantial increase of pressure in said passage, to cause both pumps to be inoperative when a predetermined volume of liquid under such increased but substantially constant pressure has been stored in said accumulator and thereafter to cause the other pump to become operative when the volume of liquid under such increased pressure has become reduced to a predetermined amount.

16. In combination, a fluid pressure operated mechanism, a pair of pumps for supplying fluid under pressure to said mechanism, an accumulator interposed between said pumps and mechanism, means for loading said accumulator for substantially uniform pressure throughout a certain volumetric range and for variable pressure throughout another volumetric range, and means controlled by said accumulator to cause both pumps to be operative during said variable pressure volumetric range and one pump only or neither pump depending on the volume of fluid in said accumulator in said substantially constant pressure range.

17. In combination, a fluid pressure operated mechanism, a pair of pumps for supplying fluid under pressure to said mechanism, an accumulator interposed between said pumps and mechanism, said accumulator comprising a cylinder, a plunger reciprocable in said cylinder, substantially constant loading means for such plunger, said plunger being hollow, a headed abutment pin in said hollow, a spring in said plunger bearing on said pin for yieldingly holding said pin projected toward the end of said cylinder as far as permitted by said head, said spring acting in opposition to said loading means while said pin is in contact with said end, and connections from said plunger for causing both pumps to be operative to deliver fluid to said mechanism throughout plunger positions during which said pin is in contact with said end, for causing one pump only to deliver fluid to said mechanism throughout a further range of movement of said plunger during which said pin is out of contact with said end, and for causing both pumps to be inoperative to deliver fluid to said mechanism adjacent to the outer limit of motion of said plunger.

18. In combination, a fluid pressure operated mechanism, a pair of pumps for supplying fluid under pressure to said mechanism, an accumulator interposed between said pumps and mechanism, said accumulator comprising a cylinder, a plunger reciprocable in said cylinder, substantially constant loading means for such plunger, said plunger being hollow, a headed abutment pin in said hollow, a spring in said plunger bearing on said pin for yieldingly holding said pin projected toward the end of said cylinder as far as permitted by said head, said spring acting in opposition to said loading means while said pin is in contact with said end, connections from said plunger for causing both pumps to be operative to deliver fluid to said mechanism throughout plunger positions during which said pin is in contact with said end, for causing one pump only to deliver fluid to said mechanism throughout a further range of movement of said plunger during which said pin is out of contact with said end, and for causing both pumps to be inoperative to deliver fluid to said mechanism adjacent to the outer limit of motion of said plunger, and means for preventing movement of said plunger between said one pump and said two pump operative ranges except under substantial pressure changes of said fluid.

RALPH E. FLANDERS.